United States Patent
Fähland et al.

(10) Patent No.: US 7,131,932 B2
(45) Date of Patent: Nov. 7, 2006

(54) METHOD FOR DETERMING A TRANSMITTABLE TORQUE OF A CLUTCH IN AN AUTOMATIC TRANSMISSION OF A MOTOR VEHICLE

(75) Inventors: Jörg Fähland, Sassenburg (DE); Bernd Cappelmann, Wendeburg (DE); Rainer Hofmann, Helmstedt (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 11/212,394

(22) Filed: Aug. 25, 2005

(65) Prior Publication Data
US 2006/0154786 A1     Jul. 13, 2006

Related U.S. Application Data

(63) Continuation of application No. PCT/EP04/01482, filed on Feb. 17, 2004.

(30) Foreign Application Priority Data
Feb. 26, 2003 (DE) ................................. 103 08 518

(51) Int. Cl.
*B60W 10/02* (2006.01)
*B60W 10/04* (2006.01)
(52) U.S. Cl. .......................................... 477/174; 477/77
(58) Field of Classification Search ................. 477/77, 477/79, 83, 174, 180, 902
See application file for complete search history.

(56) References Cited

U.S. PATENT DOCUMENTS

| 5,989,153 A | * | 11/1999 | Fischer et al. ................. 477/74 |
| 6,490,944 B1 | | 12/2002 | Heinzel et al. |
| 6,887,184 B1 | * | 5/2005 | Buchanan et al. ........... 477/174 |
| 2002/0134637 A1 | * | 9/2002 | Salecker et al. ............ 192/54.1 |
| 2006/0135316 A1 | * | 6/2006 | Fujii et al. .................... 477/156 |

FOREIGN PATENT DOCUMENTS

| DE | 199 31 160 A1 | 1/2001 |
| DE | 199 39 818 C1 | 1/2001 |
| DE | 101 01 597 A1 | 8/2001 |
| WO | WO 2004076225 A1 * | 9/2004 |

* cited by examiner

*Primary Examiner*—Tisha Lewis

(57) ABSTRACT

A method for determining a transmittable torque of a clutch of an automatic transmission of a motor vehicle, in particular an automated shift transmission, uses the clutch for transmitting torque from an engine shaft to a transmission input shaft and uses a synchronizing device for selectively engaging and disengaging a gear stage in the automatic transmission. The gear stage is pre-synchronized with the synchronizing device by applying a given synchronizing force to the synchronizing device but without engaging the gear stage. Speeds of the engine shaft and of the transmission input shaft are measured. The torque transmitted by the clutch is determined by comparing the speeds of the engine shaft and of the transmission input shaft while taking into account a current synchronizing force.

11 Claims, 1 Drawing Sheet

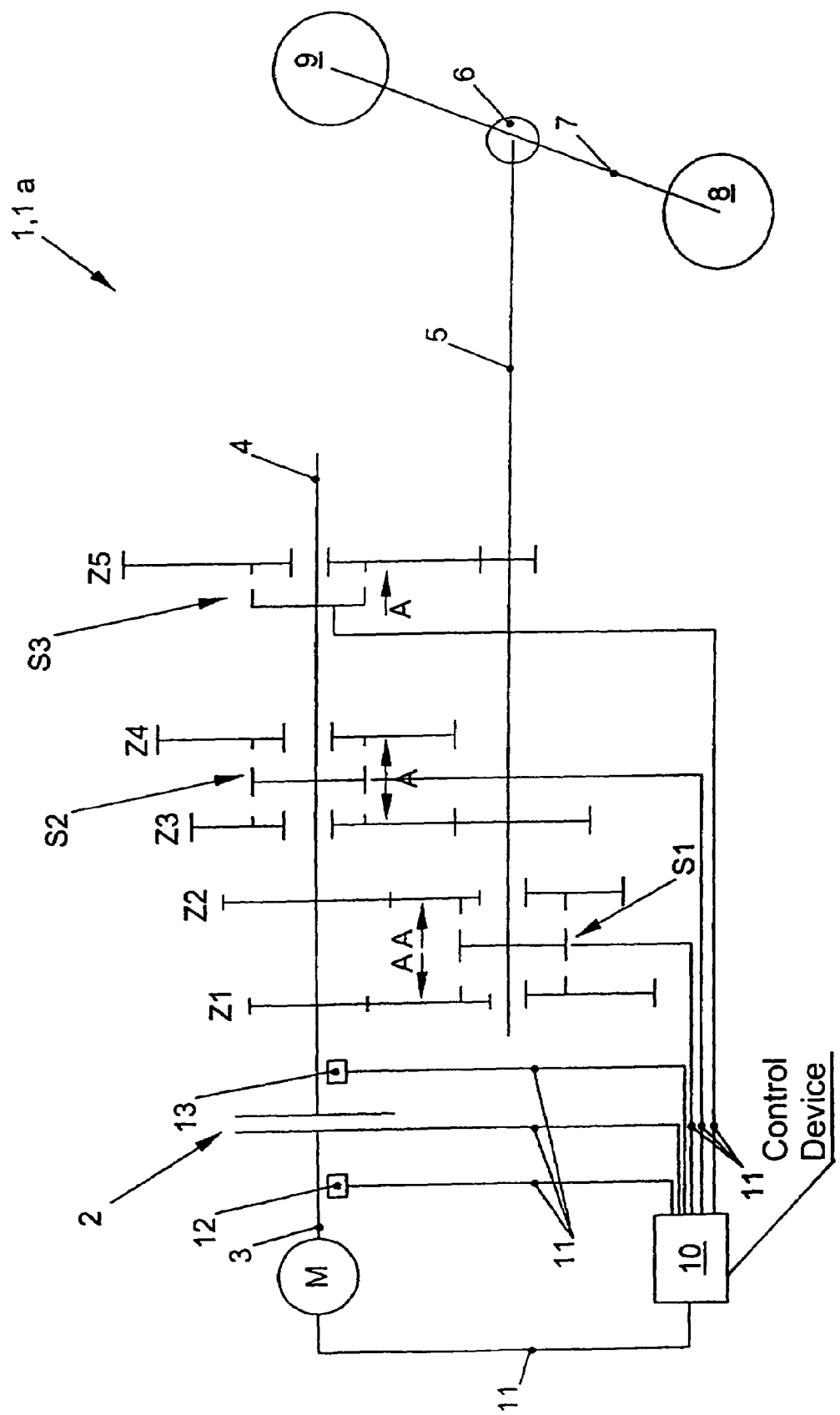

METHOD FOR DETERMINING A TRANSMITTABLE TORQUE OF A CLUTCH IN AN AUTOMATIC TRANSMISSION OF A MOTOR VEHICLE

CROSS-REFERENCE TO RELATED APPLICATION

This is a continuing application, under 35 U.S.C. § 120, of copending international application No. PCT/EP2004/001482, filed Feb. 17, 2004, which designated the United States; this application also claims the priority, under 35 U.S.C. § 119, of German patent application No. 103 08 518.1, filed Feb. 26, 2003; the prior applications are herewith incorporated by reference in their entirety.

BACKGROUND OF THE INVENTION

Field of the Invention

The invention relates to a method for determining a transmittable torque of a clutch in an automatic transmission of a motor vehicle, in particular in an automated shift transmission. Torque can be transmitted from an engine shaft to a transmission input shaft by using the clutch. The transmission has at least one gear stage, preferably a plurality of gear stages and at least one synchronizing device for engaging and/or disengaging a gear stage inside the transmission. A control device is provided for controlling the shifting of the transmission, the clutch and/or the engine torque. The speeds of the engine shaft and of the transmission input shaft are measured.

Different methods for determining a transmittable torque of a clutch of an automatic transmission of a motor vehicle are disclosed in the prior art. For example, a method of adapting the clutch characteristic and of determining a clutch-related speed gradient is described in Published, Non-Prosecuted German Patent Application No. DE 199 31 160 A1. In the method described, two shaft gradients dn/dt of the free transmission input shaft of a dual-clutch transmission are determined: on the one hand a first shaft gradient, namely the shaft gradient of the transmission input shaft under a nonloaded, namely completely disengaged, clutch; on the other hand a second shaft gradient with a slightly applied clutch. From the comparison of the shaft gradients, the clutch characteristic is then accordingly ultimately adapted. Through the use of the synchronizing device, in particular the synchronizer body or the synchronizer ring, a speed difference is realized in the conventional method between the free transmission input shaft and the running engine shaft in order to be able to determine the corresponding shaft gradients dn/dt.

The conventional method is not yet optimally configured, since the torque transmitted by a clutch still cannot be optimally determined by the method. The measuring method also takes up a certain amount of time, since in each case two speed gradients dn/dt first of all have to be determined as reference for the clutch torque. In addition, the control effort is relatively high and thus costly.

SUMMARY OF THE INVENTION

It is accordingly an object of the invention to provide a method for determining a transmittable torque of a clutch in an automatic transmission of a motor vehicle which overcomes the above-mentioned disadvantages of the heretofore-known methods of this general type and to provide the method in such a way that the control effort is reduced and the torque which can be transmitted by a clutch can be determined in a simple manner with control components already present in the system.

With the foregoing and other objects in view there is provided, in accordance with the invention, a method for determining a transmittable torque that includes the steps of:

providing an automatic transmission of a motor vehicle, the automatic transmission having a clutch for transmitting torque from an engine shaft to a transmission input shaft, having a gear stage and having a synchronizing device for selectively engaging and disengaging the gear stage in the automatic transmission;

providing a control device for controlling a shifting of the automatic transmission, the clutch, and/or an engine torque;

pre-synchronizing, with the synchronizing device, the gear stage in the automatic transmission by applying a given synchronizing force to the synchronizing device but without engaging the gear stage;

measuring speeds of the engine shaft and of the transmission input shaft; and determining a torque transmitted by the clutch by comparing the speeds of the engine shaft and of the transmission input shaft while taking into account a current synchronizing force.

In other words, according to the invention, there is provided, a method for determining a transmittable torque of a clutch in an automatic transmission of a motor vehicle, in particular in an automated shift transmission, torque being transmittable from an engine shaft to a transmission input shaft through the use of a clutch, the transmission having at least one gear stage, preferably a plurality of gear stages and at least one synchronizing device for engaging and/or disengaging a gear stage inside the transmission, a control device being provided for controlling shifting of the transmission, the clutch and/or the engine torque, and the speeds of the engine shaft and of the transmission input shaft being measured, wherein a gear stage in the transmission is pre-synchronized through the use of the synchronizing device, namely a certain synchronizing force is applied to the synchronizing device, but without the gear stage being engaged, and wherein the torque transmitted by the clutch is then determined by comparing the speeds of the engine shaft and of the transmission input shaft while taking into account the current synchronizing force.

Another mode of the method according to the invention includes determining current speeds of the engine shaft and of the transmission input shaft during an increase in an engagement force when the synchronizing device is actuated during coasting of the motor vehicle with the clutch completely disengaged and idling realized in the automatic transmission; and comparing the current speeds of the engine shaft and of the transmission input shaft with one another. In other words, during coasting of the motor vehicle, that is to say with the clutch completely disengaged and idling realized in the transmission, the current speeds of the engine shaft and of the transmission input shaft are determined and compared with one another during the actuation of the synchronizing device, namely during the increase in the engagement force.

A further mode of the method according to the invention includes determining a current synchronizing force of the synchronizing device at an instant when a current speed of the engine shaft is different from a speed of the transmission input shaft; and determining, from the current synchronizing force, a current drag torque transmitted by the clutch. In other words, at the instant at which the current speed of the engine shaft is different from the speed of the transmission input shaft, the current—first—synchronizing force of the synchronizing device is established and the current drag torque transmitted by the clutch is determined therefrom.

Another mode of the method according to the invention includes determining a current first synchronizing force of the synchronizing device at an instant when a current speed of the engine shaft is different from a speed of the transmission input shaft; determining, from the current first synchronizing force, a current drag torque transmitted by the clutch; subsequently, during coasting of the motor vehicle, but with the clutch engaged to a given degree and idling realized in the automatic transmission, determining current speeds of the engine shaft and of the transmission input shaft during an increase in a synchronizing force when the synchronizing device is actuated; comparing the current speeds of the engine shaft and of the transmission input shaft with one another; and establishing a current second synchronizing force constituting an engagement force of the synchronizing device at an instant when a current speed of the engine shaft is different from a speed of the transmission input shaft. In other words, in a further step, after the current drag torque has been determined, during coasting of the motor vehicle, but with the clutch slightly engaged and idling realized in the transmission, the current speeds of the engine shaft and of the transmission input shaft are determined and compared with one another during the actuation of the synchronizing device, namely during the increase in the synchronizing force and, at the instant at which the current speed of the engine shaft is different from the speed of the transmission input shaft, the current second engagement force of the synchronizing device is established.

Yet another mode of the method according to the invention includes determining a point on a characteristic curve of the clutch by using the second synchronizing force, in particular determining a lower point or bottom point on a characteristic curve of the clutch by using the second synchronizing force.

Another mode of the method according to the invention includes adapting the characteristic curve of the clutch subsequent to determining the current drag torque transmitted by the clutch and a corresponding current point on the characteristic curve of the clutch.

Another mode of the method according to the invention includes providing a dual-clutch transmission as the automatic transmission, the dual-clutch transmission being configured to operate in an engine torque range including first engine torques and second engine torques higher than the first engine torques; and checking a characteristic of the first engine torques by using the synchronizing device. In other words, the transmission is configured as a dual-clutch transmission, and the characteristic of low engine torques is checked through the use of the synchronizing device.

The method according to the invention is first of all based on the fundamental principle of using the synchronizing device already provided anyway in the transmission as a "torque sensor." Using the method according to the invention, the torque which can be transmitted by the clutch can now be accordingly determined through the use of components already present, namely through the use of a synchronizing device already present, the method described here thus being based on a principle which is quite different from the previously conventional principle, and this is explained in detail below.

To control shifting of the transmission, and of the clutch or to control the engine, a control device is provided which has corresponding electric and/or electronic components. The speeds of the respective shafts, that is to say the speed of the engine shaft and the speed of the transmission input shaft, are indicated to this control device. On the basis of the input data fed to the control device, the control device controls the corresponding control sequences within the transmission and the corresponding synchronizing devices, including the synchronizing forces and the engagement and/or disengagement of the clutch. In other words, through the use of the control device, firstly a certain respective synchronizing force can be set at the synchronizing device, and a certain clutch adjusting force or actuating force can also be realized at the clutch itself. The corresponding synchronizing forces or adjusting forces can be realized via hydraulic circuits and corresponding actuators that can be actuated hydraulically or also via corresponding actuators that can be actuated electrically.

For example, in fuel efficient cars, such as the so called "3 liter cars" which have an average fuel consumption of 3 liters per 100 kilometers, an automated manual transmission is provided and, using the method according to the invention described here, the torque which can be transmitted by the clutch in certain driving situations of the motor vehicle can be measured through the use of the synchronizing device which is applied as a "torque sensor." This applies in particular to "coasting" of the motor vehicle, where fuel is accordingly saved during coasting, i.e., during coasting, no gear is engaged in the transmission and the motor vehicle "glides along" without the transmission of a drive torque to the drive axle.

Other features which are considered as characteristic for the invention are set forth in the appended claims.

Although the invention is illustrated and described herein as embodied in a method for determining a transmittable torque of a clutch in an automatic transmission of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE is a schematic view of an automated manual transmission with corresponding individual components operating in accordance with the invention.

DESCRIPTION OF THE PREFERRED EMBODIMENTS

Referring now to the single FIGURE in detail there is schematically shown an automatic transmission 1 of a motor vehicle. The transmission 1 shown here is configured as an automated manual transmission 1a and is preferably used—as shown here—in the so called "3 liter car."

The automated manual transmission 1a and the clutch 2 and also the engine M can readily be seen in the FIGURE. When the engine is running, the torque can now be transmitted from an engine shaft 3 to a transmission input shaft 4 through the use of the clutch 2. The automated manual transmission 1a shown here has a plurality of gear stages, namely the first gear stage Z1, the second gear stage Z2, the third gear stage Z3, the fourth gear stage Z4 and a fifth gear stage Z5. In each case one gear stage Z1 to Z5 is formed by two separate gears, of which one is disposed on the respective transmission input shaft 4 and another is disposed on the transmission output shaft 5.

It can easily be seen that the transmission output shaft 5 is operatively connected to the axle drive 6, which transmits the force to the axle 7 or the wheels 8 and 9.

Furthermore, a plurality of synchronizing devices S1 to S3 are provided inside the transmission 1. Thus, either the first gear stage Z1 or the second gear stage Z2 is engaged via the synchronizing device S1, or the third gear stage Z3 or the fourth gear stage Z4 is engaged via the second synchronizing device S2, and finally the fifth gear stage Z5 can be engaged via the third synchronizing device S3. The synchronizing devices S1 to S3 are realized in the conventional manner and therefore have the corresponding synchronizing rings or synchronizing bodies and also the corresponding sliding-sleeve units. The individual synchronizing devices S1 to S3 can each be activated accordingly, which is represented by the corresponding arrows A.

If, for example, the first synchronizing device S1 is shifted to the right, so that the second gear stage Z2 is engaged, the power flow then runs from the engine M via the engine shaft 3, then via the preferably engaged clutch 2 to the transmission input shaft 4 and via the second gear stage Z2 to the transmission output shaft 5, from here to the axle drive 6 or finally to the wheels 8 and 9.

Furthermore, it can be seen from the FIGURE that a control device 10 is provided which is appropriately operatively connected via signal lines 11 to the engine M and the actuators for the clutch 2 and the synchronizing devices S1 to S3. Furthermore, the control device 10 is operatively connected via corresponding further signal lines 11 to corresponding speed sensors, namely, in particular, to a first speed sensor 12 and to a second speed sensor 13. In this case, the first speed sensor 12 measures the speed of the engine shaft 3 and the second speed sensor 13 measures the speed of the transmission input shaft 4. Since the control device 10 implements the corresponding control operations of the method according to the invention, it has electric and/or electronic components, in particular a microprocessor.

The synchronizing devices S1 to S3 and the clutch 2 can be actuated either electrically and/or hydraulically. Consequently, the actuations of the clutch 2 and the engaging and disengaging actions of the synchronizing devices S1 to S3, that is to say the respective clutch actuating forces or synchronizing forces, can be set here via hydraulic or electric actuators. To set the corresponding synchronizing forces, the control device 10 transmits the corresponding signals, that is to say the corresponding manipulated values for synchronization or, for realizing the clutch actuating forces, the corresponding manipulated values for the clutch.

The respective application determines whether preferably hydraulic circuits or actuators which can be activated electrically are used for realizing the clutch actuating force or the synchronizing force.

The disadvantages described at the beginning are avoided by virtue of the fact that a gear stage in the transmission 1 is pre-synchronized through the use of the synchronizing device, namely a certain synchronizing force is applied to the synchronizing device but without the gear stage being engaged, and that the torque transmitted by the clutch 2 is then determined by comparing the speeds of the engine shaft 3 and the transmission input shaft 4 while taking into account the current synchronizing force. Here, for example, the gear stage Z2 in the transmission 1 is preferably pre-synchronized through the use of the synchronizing device S1. It is also conceivable for the gear stage Z1 to be pre-synchronized or for the other gear stages Z3 to Z5 to be pre-synchronized through the use of the other synchronizing devices S2 and S3. This may possibly also depend in particular on the current engine speed or the travel speed of the motor vehicle. The invention is therefore to be explained below by way of example essentially for preferably one synchronizing device to be actuated. In other words, one of the synchronizing devices S1 to S3 is used as a "torque sensor"; in particular, the corresponding synchronizer body or synchronizer ring of the respective synchronizing device S1 to S3 is used as a "torque sensor."

In this respect, the method according to the invention is to be explained in more detail below: the corresponding data for the current speed of the engine shaft 3 and for the current speed of the transmission input shaft 4, respectively, are available to the control device 10. During coasting or overrunning conditions of the motor vehicle, the clutch 2 of the motor vehicle is preferably completely disengaged and idling is realized in the transmission 1, that is to say no gear stage Z1 to Z5 is engaged in the transmission 1, and thus the synchronizing devices S1 to S3 are preferably in their neutral position. The motor vehicle "glides", and thus no drive torque is applied at the wheels 8 and 9.

In this operating phase of the motor vehicle, a certain gear, for example the second gear stage Z2, is pre-synchronized through the use of the synchronizing device S1. At the same time, the speeds of the engine shaft 3 and of the transmission input shaft 4 are measured, that is to say during the actuation of the synchronizing device S1, that is to say while the synchronizing force of the synchronizing device S1 increases in the direction of the gear stage Z2. In other words, during the engagement of the synchronizing device S1 in the direction of the gear stage Z2, which, however, is only pre-synchronized but not engaged, the speeds of the engine shaft 3 and of the transmission input shaft 4 are constantly compared with one another. On account of drag torques present in particular in wet-running clutches, as is also the case here in the clutch 2, the transmission input shaft 4 is accordingly "dragged along" by the engine shaft 3 and their speed difference increases—even when clutch 2 is completely disengaged. If a certain increasing synchronizing force is now applied to the synchronizing device S1, the current speed of the engine shaft 3 will then "break away" from the speed of the transmission input shaft 4 at some particular instant or other. In other words, the current speeds of the engine shaft 3 and of the transmission input shaft 4 are then accordingly considerably different at this instant. The current synchronizing force $F_1$ of the synchronizing device S1 is then established for this instant.

On account of the data present in the control device 10, on account of the known geometrical data of the transmission 1, and—in the case of hydraulic controls—on account of the known pressures or—in the case of electric controls—on account of the known corresponding activation/settings of the electric actuators, the control device 10, on account of the synchronizing force $F_1$, determined for this instant, of the synchronizing device S1, can determine or calculate the current drag torque transmitted by the clutch 2.

According to the first step, described above, of the method, a certain torque, through the use of a synchronizing device, is applied at the transmission input shaft 4 by the pre-synchronizing of a gear with the synchronizing device, and this torque is increased by an increasing synchronizing force of the synchronizing device S1 until the speed of the engine shaft 3 "breaks away" from the transmission input shaft 4. On account of the known geometry of the transmission 1, the control device 10 can then determine the torque currently transmitted to the transmission input shaft 4, since the synchronizing force $F_1$ of the synchronizing device S1 is then known for this instant.

Through the use of this first step of the method, the drag torque transmitted by the clutch 2 is essentially determined or the slight power losses still present, such as friction in pistons or in bearings for example, can then also be appropriately eliminated. That is to say that, with the first step of the method, in particular the drag torques of the clutch 2 (including the other slight power losses) can be determined and, as known variables, can be used for the following method step as initial values, which is explained below.

Then, in a further, second step of the method, after the current drag torque in the clutch 2 has been determined, likewise during coasting of the motor vehicle, although with a slightly engaged clutch preferably at an implemented clutch adjusting force of 2 to 10 Nm and with idling still implemented in the transmission, the current speeds of the engine shaft 3 and of the transmission input shaft 4 are determined and compared with one another during the actuation of the synchronizing device S1, namely during the implementation of a certain synchronizing force $F_2$. The second engagement force $F_2$, at which the speeds of the engine shaft 3 and of the transmission shaft 4 then "break away" again, is greater by a certain amount, that is by a certain $\Delta F$, than the first engagement force $F_1$. Essentially, $F_2$ is equal to $F_1 + \Delta F$, in which case, in the second method step, the certain second synchronizing force $F_2$ is realized by an incremental increase in the first synchronizing force $F_1$ by the amount $\Delta F$. During the increase in the corresponding synchronizing force—in the second method step—the current speeds of the engine shaft 3 and of the transmission input shaft 4 are compared with one another; as soon as the speeds "break away", the current synchronizing force $F_2$ of the synchronizing device S1 is established, in which case the control device 10 can then determine therefrom a point on the clutch characteristic curve close to the lower characteristic point of the clutch 2. For this purpose, the control device 10, on account of the known second synchronizing force $F_2$, can then again deduce the torque actually applied at the transmission input shaft 4 with the synchronizing device or the torque then applied at the clutch 2.

Consequently, the lower characteristic point of the clutch 2 can be determined within as short a time as possible, the first and second method steps being carried out shortly after one another and the entire method being repeated within certain time periods.

Ultimately, after the corresponding determination of the current drag torque and of the corresponding characteristic point, the clutch characteristic curve of the clutch 2 can be adapted accordingly, so that the current clutch characteristic curve of the clutch 2 can be produced and stored by using the control device 10. This permits quick and accurate activation of the corresponding shift sequences inside the transmission 1.

If the transmission 1 is preferably configured as a dual-clutch transmission, the engine torques signaled back from the engine M to the control device, for example, can also be checked through the use of the respective synchronizing device, which in turn, for example, represents an application different from that described above. Thus, through the use of a synchronizing device, a defined disturbing torque can be applied at a certain gear stage of the transmission configured as dual-clutch transmission, namely at a gear stage of the "free partial transmission", even with a correspondingly engaged clutch. The clutch capacity is preferably then greater than the set disturbing torque via the synchronizing device, so that the clutch still retains or still works with adhesion. The engine must now correct the additional torque applied by the synchronizing device and signals the corresponding change in the engine torque to the control device, which is then responsible for or realizes the corresponding correction of the engine torque. During corresponding feedback measurements of a plurality of operating points, the actual characteristic of the engine torques can then be determined for certain low torques.

Although the method has essentially been described here using the synchronizing device S1, it can also be carried out through the use of other synchronizing devices S2 and S3 or further synchronizing devices. The decisive factor is that the respective synchronizing device is used essentially as a "torque sensor", that is to say a synchronizing force F is applied to the synchronizing device without the respective gear in the transmission being engaged, that is to say the respective gear is only "pre-synchronized." At the moment when the speeds of the engine shaft 3 and of the transmission input shaft 4 break away from one another, that is to say are different from one another and diverge, the control device 10, on account of the certain synchronizing force $F_1$ or $F_2$ applied at this instant, can ultimately deduce or determine the torque applied at the clutch 2.

We claim:

1. A method for determining a transmittable torque, the method which comprises:
   providing an automatic transmission of a motor vehicle, the automatic transmission having a clutch for transmitting torque from an engine shaft to a transmission input shaft, having a gear stage and having a synchronizing device for selectively engaging and disengaging the gear stage in the automatic transmission;
   providing a control device for controlling at least one of a shifting of the automatic transmission, the clutch, and an engine torque;
   pre-synchronizing, with the synchronizing device, the gear stage in the automatic transmission by applying a given synchronizing force to the synchronizing device but without engaging the gear stage;
   measuring speeds of the engine shaft and of the transmission input shaft; and
   determining a torque transmitted by the clutch by comparing the speeds of the engine shaft and of the transmission input shaft while taking into account a current synchronizing force.

2. The method according to claim 1, which comprises:
   determining current speeds of the engine shaft and of the transmission input shaft during an increase in an engagement force when the synchronizing device is actuated during coasting of the motor vehicle with the clutch completely disengaged and idling realized in the automatic transmission; and
   comparing the current speeds of the engine shaft and of the transmission input shaft with one another.

3. The method according to claim 1, which comprises:
   determining a current synchronizing force of the synchronizing device at an instant when a current speed of the engine shaft is different from a speed of the transmission input shaft; and
   determining, from the current synchronizing force, a current drag torque transmitted by the clutch.

4. The method according to claim 1, which comprises:

determining a current first synchronizing force of the synchronizing device at an instant when a current speed of the engine shaft is different from a speed of the transmission input shaft;

determining, from the current first synchronizing force, a current drag torque transmitted by the clutch;

subsequently, during coasting of the motor vehicle, but with the clutch engaged to a given degree and idling realized in the automatic transmission, determining current speeds of the engine shaft and of the transmission input shaft during an increase in a synchronizing force when the synchronizing device is actuated;

comparing the current speeds of the engine shaft and of the transmission input shaft with one another; and establishing a current second synchronizing force constituting an engagement force of the synchronizing device at an instant when a current speed of the engine shaft is different from a speed of the transmission input shaft.

5. The method according to claim 4, which comprises determining a point on a characteristic curve of the clutch by using the second synchronizing force.

6. The method according to claim 4, which comprises determining a bottom point on a characteristic curve of the clutch by using the second synchronizing force.

7. The method according to claim 5, which comprises adapting the characteristic curve of the clutch subsequent to determining the current drag torque transmitted by the clutch and a corresponding current point on the characteristic curve of the clutch.

8. The method according to claim 1, which comprises:
providing a dual-clutch transmission as the automatic transmission; and
checking a characteristic of engine torques by using the synchronizing device.

9. The method according to claim 1, which comprises:
providing a dual-clutch transmission as the automatic transmission, the dual-clutch transmission being configured to operate in an engine torque range including first engine torques and second engine torques higher than the first engine torques; and
checking a characteristic of the first engine torques by using the synchronizing device.

10. The method according to claim 1, which comprises providing an automated shift transmission as the automatic transmission.

11. The method according to claim 1, which comprises providing a plurality of gear stages and a plurality of synchronizing devices in the automatic transmission.

* * * * *